(12) United States Patent
Bölsing et al.

(10) Patent No.: US 6,649,044 B1
(45) Date of Patent: Nov. 18, 2003

(54) PROCESS FOR THE REDUCTIVE DEHALOGENATION OF HALOGENATED HYDROCARBONS

(75) Inventors: Friedrich Bölsing, Lindhorst (DE); Achim Habekost, Algermissen (DE)

(73) Assignee: DCR International Environmental Services B.V., Amsterdam (NL)

( * ) Notice: Subject to any disclaimer, the term of this patent is extended or adjusted under 35 U.S.C. 154(b) by 0 days.

(21) Appl. No.: 09/496,015

(22) Filed: Feb. 1, 2000

(30) Foreign Application Priority Data

Feb. 2, 1999 (DE) .......................... 199 03 986

(51) Int. Cl.$^7$ .......................... C10G 45/00; C07C 1/26
(52) U.S. Cl. .................. 208/262.1; 208/262.5; 585/469; 585/641; 585/733; 588/206; 588/207
(58) Field of Search .......................... 208/262.1, 262.5; 588/206, 207; 585/469, 641, 733

(56) References Cited

U.S. PATENT DOCUMENTS

| 3,523,982 | A | * | 8/1970 | Vives | 585/642 |
|---|---|---|---|---|---|
| 4,377,471 | A | * | 3/1983 | Brown et al. | 208/262 |
| 4,639,309 | A | * | 1/1987 | Lalancette et al. | 208/262 |
| 4,853,040 | A | * | 8/1989 | Mazur et al. | 134/2 |
| 4,950,833 | A | * | 8/1990 | Hawari et al. | 585/469 |
| 5,096,600 | A | * | 3/1992 | Hoch | 210/751 |
| 5,110,364 | A | * | 5/1992 | Mazur et al. | 134/2 |
| 5,345,031 | A | * | 9/1994 | Schwartz et al. | 588/206 |
| 5,414,200 | A | * | 5/1995 | Mouk et al. | 588/205 |
| 5,559,278 | A | * | 9/1996 | Mouk et al. | 588/205 |
| 5,602,295 | A | * | 2/1997 | Abel et al. | 588/205 |

* cited by examiner

*Primary Examiner*—Walter D. Griffin
(74) *Attorney, Agent, or Firm*—Norris McLaughlin & Marcus

(57) ABSTRACT

The present invention relates to a process for the reductive dehalogenation of halogenated hydrocarbons. It comprises reacting halogenated hydrocarbons with a reducing metal and a hydrogen donating compound in the presence of an amine. Preferably, the halogenated hydrocarbons are reacted with lithium, potassium, calcium, sodium, magnesium, aluminum, zinc or iron. Depending on the metal, the complete reductive dehalogenation takes place at temperatures ranging from room temperature to 400° C.

26 Claims, No Drawings

PROCESS FOR THE REDUCTIVE DEHALOGENATION OF HALOGENATED HYDROCARBONS

The present invention relates to a process for the reductive dehalogenation of halogenated hydrocarbons through chemical reaction with reducing metals in the presence of a hydrogen donating compound characterized in that the dehalogenation reaction is carried out in the presence of an amine.

Halogenated hydrocarbons in this context are aliphatic, aromatic and mixed aliphatic-aromatic hydrocarbons, which contain at least one hologen in a molecule, including those hydrocarbons, which, in addition to halogen, contain other functional groups, for instance chlorophenols.

Hydrogen donating compounds in this context are all compounds, which can provide hydrogen formally as protons or atomic hydrogen in order to saturate anions and radicals respectively, for instance alcohols, amines, aliphatic hydrocarbons.

Halogenated hydrocarbons are toxic. This can be attributed to the presence of halogen in the molecule. Accordingly, toxic halogenated hydrocarbons can be detoxified through removal of the halogen. Since one single halogen in a molecule can cause a disproportionate high toxicity, it is essential, therefore, to dehalogenate multiply halogenated hydrocarbons in such a way that all the halogen atoms will be removed. This is chemically possible only in case of a reductive dehalogenation.

Halogenated aromatics like polychlorinated biphenyls (PCB), polychlorinated phenols (PCP) and polychlorinated dibenzodioxins and dibenzofurans (PCDD/PCDF) are extremely toxic. PCDD/PCDF, which generally are subsumed under the term "dioxins" are regarded as ultratoxic. Aliphatic halogenated compounds like hexochlorocyclohexane (HCH) or mixed aliphatic-aromatic compounds like trichloro-bis(chlorophenyl)ethane (DDT) are also toxic even though they are not classified as ultratoxics in general. All these compounds quoted here are, along with other halogenated hydrocarbons, widely spread in the environment. Due to their bioavailability they own a high hazard potential which to abolish must be regarded as an important demand of environmental relevance.

BACKGROUND OF THE INVENTION

There is a number of processes which deal with the reductive dehalogenation of halogenated hydrocarbons. According to EP 0 099 951 PCB is dehalogenated by means of finely dispersed molten sodium at 100 to 160° C. According to U.S. Pat. No. 4,973,783 halogenated aromatics are reacted with alkali metal in the presence of hydrosiloxane. In U.S. Pat. No. 4,639,309 halogenated hydrocarbons are dehalogenated with sodium or potassium at 100° C. with the aid of mechanical abrasion of the formed halogenides. According to U.S. Pat. No. 4,950,833 halogenated aromatics are reacted with alkali metal in the presence of ammonium salts at 40 to 60° C. and according to the Canadian Application 2026506, in which a whole lot of further processes are quoted referring to the state of the art, halogenated aromatics are treated with finely dispersed sodium or calcium in the presence of methanol, ethanol or isopropanol at temperatures below 100° C. A process of particular effectiveness seems to be described in EP 0 225 849, in which halogenated aliphatic or aromatic compounds are reacted with sodium in an inert solvent in the presence of a $C_1$- to $C_5$-alkohole at temperatures between 10 and 150° C.

The quoted processes have some significant disadvantages. The most important drawback is that said processes are restricted to the use of alkali and earth alkali metals, further in that, as a rule, the reaction temperature must be above the melting point of sodium and that the reaction must be carried out in a homogenous liquid medium in an atmosphere of protecting gas. Said processes are, on no account, applicable to the solution of environmental problems in practice, for instance, to dehalogenate PCB in sludge, dioxins in wet soil, PCP in sand, HCH in a mix of waste material in landfills etc.

Therefore, it would be highly desirable to provide a process efficient to chemically and technically simply dehalogenate halogenated hydrocarbons of whatsoever origin as such or as contaminants in other materials without the restrictions and drawbacks as quoted above.

SUMMARY OF THE INVENTION

In accordance with the present invention there is now provided a process for the reductive dehalogenation of halogenated hydrocarbons through chemical reaction with reducing metals in the presence of a hydrogen donating compound characterized in that the dehalogenation reaction is carried out in the presence of an amine.

DETAILED DESCRIPTION

Amines applicable within the scope of the present invention are aliphatic primary, secondary and tertiary amines or diamines or amines with additional functional groups, in particular amino alcohols, or mixes of said amines or mixes of said amines with hydrogen donating compounds selected from other chemical families.

It is very much surprising that dehalogenating reactions can be accelerated through the addition even of very low proportions of amines in such a way that, for instance, the dehalogenation of trichlorobenzene with finely dispersed sodium will take place at room temperature in the form of a deflagration within less than one second. Without the addition of amine the same reaction will need a reaction temperature around 120° C. and a reaction time of greater than 30 minutes.

It might be assumed that the acceleration of the dehalogenating reaction through an amine is based on its reaction with sodium yielding an amide, which, as a extremely highly reactive intermediate, may react vigorously with the chloro compound. However, this cannot be true, because tertiary amines have the same accelerating effect.

It is helpful, from a practical point of view, to imagine that the amine covers the metal surface substantively thus protecting the metal from being covered with an inhibiting layer comprising metal halogenide and halogenated hydrocarbons attached via radical anions.

These layers, which will be created without the addition of amines, deactivate the metal surface in such a way that the reaction comes to a standstill even in case highly reactive metals are applied, for instance sodium or potassium. For the same reason less reactive metals like iron, zinc, aluminum, magnesium do react not at all. Only through the addition of amines said metals can be rendered applicable. Within the scope of the present invention lithium, potassium, calcium, sodium, magnesium, aluminum and zinc, including the corresponding alloys, are of particular effectiveness.

The choice of the metal to be applied depends on the target. For the dehalogenation of halogenated hydrocarbons as such, i.e. in its undiluted form, sodium and potassium are too reactive in the presence of amines. In this case it is necessary to dilute the halogenated hydrocarbons with sand or other inert materials, in particular inert liquids. For this reason it is recommended to make use of iron, magnesium or aluminum. The application of zinc is restricted to special cases because of the potential toxicity of this metal.

The reaction with the less reactive metals can be carried out best by vigorous mixing at increased temperatures, for instance at 40 to 160° C. In order to dehalogenate halogenated hydrocarbons in solid materials, for instance dioxins as a contaminant in filter dust, sodium is the preferably used as the reducing metal; the reaction takes place in a vibrating ball mill in the presence of amines at room temperature.

It is obvious that there is a close relationship between the concentration of the halogenated hydrocarbons, the redox potential of the metal, the temperature, the reaction time, the intensity of mixing and the metal particle size respectively. However, the reaction itself is practically independent of the type of the halogenated hydrocarbons and of the amine as well. Therefore, it is easy for a person skilled in the art to determine how a special dehalogenation project has to be carried out. If necessary, a simple laboratory test will provide the optimum reaction parameters.

With a given concentration of halogenated hydrocarbons (which includes the number of halogen atoms to be removed from a molecule), a high reactivity of the metal and vigorous mixing one might expect a very short reaction time at low starting temperature in the presence of an amine. For example, a mix of 50% HCH in an inert material explodes on mixing with finely dispersed sodium in merely stoichiometric quantity at room temperature in a fraction of a second. If the halogenated hydrocarbons are less concentrated and if the metal has a lower reactivity then one can expect medium reaction times at moderate temperatures. Said reaction times can significantly be decreased if the reaction temperature is significantly increased. For example, dioxins in processed pulverulent soil need, with finely dispersed iron in the presence of amine, a reaction time of about 30 seconds at 350° C. If magnesium chips are ground in a ball mill in more than a stoichiometric proportion with the halogenated hydrocarbon in the presence of a hydrogen donating compound and an amine, the reaction time for a complete dehalogenation will be about 15 minutes at room temperature It is therefore easy for a person skilled in the art to select the optimum conditions for any sort of dehalogenation reaction, i.e. according to the type of starting material and the nature of the task and, last but not least, to the economic conditions.

The radical anions created by electron transfer require hydrogen to form the corresponding hydrocarbon from the halogenated hydrocarbon. Said hydrogen is provided by a hydrogen donating compound. In case that primary or secondary amines are used as accelerators the hydrogen may come from these sources. This applies in particular for amines with OH-groups, i.e. amino alcohols. If tertiary amines are applied, a hydrogen donating compound must be added at any rate, for instance in the form of a lower reactive alcohol such as butanol.

The metals must be added in at least stoichiometric quantity; the amines in such a quantity that for each halogen one hydrogen is available. That means that ½ equivalent/halogen will be needed in case of primary amines and 1 equivalent/halogen in case of secondary amines. If diamines are applied, e.g. ethylenediamine, all the 4 H can be taken into account. If tertiary amines are applied the hydrogen has to be taken from a hydrogen donating compound, for instance from butanol or isopropanol, the required quantity of which is calculated in the same way. The quantity of the amine can be reduced in this case to $\frac{1}{10}$ equivalent/halogen. The quantity of amine can also be cut down to the same proportion if primary or secondary amines are being used along with an alcohol. However, the quantity of amine is not permitted to be less than $\frac{1}{10}$ equivalent/halogen in order to maintain the full reactivity of the metal surface.

The quantity of metal and amines to be added can be increased if kinetic aspects play a role. For instance, if 10 kg waste oil is contaminated with 360 mg PCB, (equal to 36 ppm), and the biphenyl contains, for instance, 6 Cl per molecule biphenyl as an average, then it would be sufficient to add not more than 276 mg sodium and 222 mg propylamine for a complete dehalogenation. However, in order to increase the number of dehalogenating collisions the quantity of sodium and amine can readily be increased tenfold without any drawback. On the other hand, the excess of both compounds can be halved if the sodium is finely dispersed on a finely dispersed carrier and the amine on calcium hydroxide by means of a dispersing chemical reaction (DCR). If butanol is added as the hydrogen donating compound the tenfold excess of amine can be cut down to 222 mg again.

It goes without saying that the particle size of the active metal surface area is of crucial importance. In case dehalogenating reactions are to be carried out in a solid matrix, the amines and the hydrogen donating compound should preferably be added adsorptively bonded to a finely dispersed solid carrier in order to increase the homogeneity of the reaction mixture and thus to decrease the reaction time. The degree of dispersion of the finely dispersed formulation can be optimized if it is prepared by means of a dispersing chemical reaction (DCR).

The amines and the hydrogen donating compounds may be added to the reaction mixture of halogenated hydrocarbons and metal all at once or in several proportions or continuously during the course of the reaction. The latter form of addition may be advantageous in that the reaction inhibiting layer of radical anions will be removed to the same extent as it is being formed. A partially or even continuously added alcohol with its low actual local concentration will not react with the metal, for instance sodium, in a metal consuming competitive reaction merely yielding hydrogen gas.

Ductile metals like lithium, potassium and sodium can be finely dispersed very evenly on an inert carrier, for instance aluminum oxide or silicates, by means of grinding mills with particular high friction. As a result of this the surface area will significantly be increased and thus activated to such a large extent that the mix becomes already pyrophoric.

In order to handle these active mixes without protecting gases they may be rendered inert mechanically or chemically. Inertizing mechanically means in this context covering the active particles with hydrophobic solids, for instance talcum; chemical inertization means hydrophobizing the active particles with an hydrophobizing compound, for instance a long-chain amine, e.g. stearylamine.

As regards the technical implementation of dehalogenating reactions the following variants are of practical importance.

Liquid halogenated hydrocarbons as such or as contaminants in liquids, for instance transformer oil, condenser oil or hydraulic oil or in waste oils etc. can be reacted in a batch process, if necessary after dilution with an inert liquid, or continuously in a flow reactor. In this case all the necessary agents are injected into the stream of liquid material to be treated before it enters the reactor. The flow reactor can be chilled and, if necessary, heated. Hence, the residence time can be adjusted via the temperature and the length of the pipes in the flow reactor at a given rate of flow and a known reactivity. The components can also be held in a cyclic process as long as necessary for complete dehalogenation.

Halogenated hydrocarbons present as contaminants in solids, which are free from water or almost free, e.g. ash and filter dust, can be dehalogenated continuously or discontinuously in a reactor tube, in an intensive or compulsory mixer, in a rotary kiln, in a fluidized bed reactor, in a packed solid bed reactor or in a solid flow reactor.

In a matrix free from water sodium can be added, in a matrix which is almost dry magnesium can be added. In an originally water containing matrix sodium can be used only in case the material is thermally or, more advantageous, chemically dried beforehand, for instance through the addition of absorbing agents such as calcium oxide and aluminum alcoholate.

It is also possible to heat the mix of reaction partners in a solid flow reactor for a short time up to a relatively high temperature, for instance for some seconds up to 400° C. This process is the most-favoured one in case large quantities of contaminated solids are to be decontaminated economically, i.e. with less expensive metals such as iron powder or aluminum flakes.

Halogenated hydrocarbons as contaminants in soil or soil-like materials, such as sediments, industrial residues and by-products, which contain water, must be completely dried for a dehalogenation reaction with alkali metals and must be largely dried for a dehalogenation with other metals. For a dehalogenation in a solid flow reactor or in a fluidized bed reactor the matrix must be disintegrated to form a pulverulent material in order to achieve a optimum homogeneous distribution of all reaction partners in the solid matrix.

Drying can be carried out thermally or chemically through the addition of absorbing agents. An appropriate disintegration can be achieved by grinding the dried material. A solid dispersion with optimum properties can be manufactured through disintegration and drying the water containing matrix in one step by means of a dispersing chemical reaction (DCR) using hydrophobized calcium oxide.

If necessary, a solid dispersion thermally or chemically pre-dried or prepared through grinding or by means of a dispersing chemical reaction (DCR) can be rendered completely dry through the addition of aluminum alcoholate. Since in this case an alcohol is being formed through the hydrolysis of the alcoholate, an additional application of a hydrogen donating compound is not necessary.

Halogenated hydrocarbons as contaminants in a gas phase or halogenated hydrocarbons which have been transferred into a gas phase, for instance by thermal stripping of a solid dispersion, can advantageously be dehalogenated by passing a heatable solid bed reactor which is charged with the reducing metal, e.g. iron powder on a granulated carrier. The amine and the hydrogen donating compound are injected into the gas stream before entering the reactor.

Halogenated hydrocarbons which have been transferred into a gas phase may be condensed or adsorbed and thus separated and purified. The dehalogenating reaction will be carried out then afterwards.

The benefits of the present invention can be summarized as follows:

The application of amines as an auxiliary agent for the efficient and economic dehalogenation of halogenated hydrocarbons as such or as contaminants in gases, liquids and solids significantly increases the effectiveness of reductive dehalogenation reactions known so far. Even dehalogenation reactions, which have been regarded as not to take place because of the low reactivity of the reaction partners can, according to the invention, be carried out now for a complete removal of halogen from halogenated hydrocarbons.

Due to the numerous feasible variants regarding the execution of the dehalogenating reactions according to the invention it is possible now to solve environmental problems with halogenated hydrocarbons in most practice-relevant cases, in particular with halogenated hydrocarbon in waste oil, in oily residues and in polluted soils or soil-like materials even in critical compositions. The reaction temperature necessary to dehalogenate halogenated hydrocarbons in a liquid form or within a solid matrix with reducing metals can significantly be decreased through the addition of amines. Bölsing/Habekost: Process for the Reductive Dehalogenation of Halogenated Hydrocarbons

EXAMPLES

1. Dehalogenation of PCB in Solution 1 liter of waste oil contaminated with 530 mg PCB, the chlorine content of which being 49% and thus representing a tetrachlorobiphenyl, was stirred 15 minutes at room temperature with 300 mg n-Butylamine and 1.5 g of a pyrophoric solid dispersion of 30% sodium on a finely dispersed calcium silicate, which had been prepared by means of a planetary ball mill. After sedimentation and separation the PCB content of the waste oil was less than 0.6 mg/l.

When stirring the same oil with double the quantity of sodium at 40° C. the residual concentration is less than 0.1 mg/l PCB.

On passing the same waste oil with the same reagents though a steel tube of 3 mm in diameter heated up to 80° C. a complete dehalogenation takes place within 35 seconds.

Although for a complete dehalogenation only 2 equ/Cl Na are necessary it is, due to the requirements of reaction kinetics, of advantage to add, as a rule, 4 to 10 equ/Cl Na.

n-Butylamine may be replaced through other amines, e.g. ethylenediamine. The amines may be replaced up to 90% by a hydrogen donating compound. Details may be taken from the following list the results of which refer to dehalogenation experiments with 2000 ppm 1,3,5-trichlorobenzene in n-hexane and 10 equ/Cl Na in suspension after 10 min at 40° C.:

| Additives | equ/Cl | Percentage Conversion |
| --- | --- | --- |
| without amine | | close to 0 |
| n-butylamine | 1 | 100 |
| cyclohexylamine | 1 | 100 |
| isopropylamine | 1 | 100 |
| n-butylamine | 0.1 | 100 |
| n-butanol | 1 | |
| n-butylamine | 0.01 | 86 |
| n-butanol | 1 | |
| n-butylamine | 0.01 | 100 |
| n-butanol | 1 | (cont. addition) |
| stearylamine | 0.1 | 78 |
| n-butanol | 1 | |
| n-butylamine | 0.1 | 100 |
| diglyme | 1 | |
| n-butylamine | 0.1 | 100 |
| 1-hexine | 1 | |

2. Dehalogenation of Chloroaromatics in Substance

Because the reaction of halogenated aromatics with metals is a very exothermic one, reactions in the presence of amines must be appropriately retarded.

On the addition of 0.02 g (2 equ/Cl) Li in the form of some small pieces at room temperature to 0.157 g (1,4.10$^{-3}$ mol) monochlorobenzene in 2 ml toluene there is no reaction detectable. However, as soon as 1 equ/Cl n-propylamine has been added a violent reaction occurs and the temperature increases, despite the very small quantity involved, within 1 min up to 60° C.

2.1 Dehalogenation After Dilution With an Inert Solvent

To 4 g of a waste oil contaminated with 2.9 g (1/100 mol) PCB with 49% Cl 3.2 g n-butanol (4/100 mol) and 0.28 n-butylamine (4/1000 mol) was added. This solution was stirred while 2 g (2 equ/Cl +10% excess) sodium in the form of a 50% dispersion on a solid carrier were added in small portions. The reaction mixture was held at a temperature below 80° C. by cooling. Under these conditions a complete dehalogenation takes place within a few minutes.

2.2 Dehalogenation After Dilution in a DCR Reaction

The contaminated waste oil of example 2.1 may be chemically dispersed with about the same quantity of CaO and the resulting dry pulverulent reaction product may be reacted with the same reaction partners as given in 2.1 through grinding in a ball mill at room temperature. Complete dehalogenation can thus be achieved within 15 minutes.

3. Dehalogenation of PCDD/PCDF in Fly Ash

Fly ash from a waste incinerator contaminated with 2370.0 ng/kg TE was reacted with sodium according to the instruction given in example 2.2. After a reaction time of 15 min there is still a concentration of 221.8 ng/kg TE detectable. However, if one adds 5% of a solvent, e.g. toluene or tetraglyme, then, under the same reaction conditions, the concentration of PCDD/PCDF is below the detection limit. With a larger proportion of solvent, e.g. with 10%, a pasty material is being formed which now easily can be reacted in a double screw reactor. If less reactive metals are applied the temperature must be increased accordingly. In this case the reactor (ball mill, kneader etc.) must be heatable.

What is claimed is:

1. A process for the reductive dehalogenation of halogenated hydrocarbon, the process comprising the steps of:
    a) contacting said halogenated hydrocarbon with solid particles of a reducing metal in the presence of a hydrogen donating compound and at last one amine, wherein, said halogenated hydrocarbon comprises one or more halogenated hydrocarbons, and the at least one amine is present at substoichiometric amounts relative to halogen content;
    b) performing the dehalogenation in either a gas, a liquid, a dry solid, or wet solid, wherein any halogenated hydrocarbon is completely and non-selectively dehalogenated; and,
    c) wherein at least a substantial portion of the dehalogenated hydrocarbon parent remains intact.

2. The process of claim 1, wherein said reducing metal is selected from the group consisting of lithium, potassium, sodium, magnesium, aluminum, zinc, iron and their alloys.

3. The process of claim 1, wherein said amine is selected from the group consisting of aliphatic primary amines, secondary amines, tertiary amines, diamines, amines with additional functional groups and mixtures thereof.

4. A process according to claim 1, wherein said amine comprises one or more primary, secondary or tertiary amines, or one or more diamines, or one or more amines having additional functional groups or mixes thereof and a hydrogen donating compound selected from the group consisting of water, aliphatic alcohols, ethers, polyols, polyethers, etheralcohols, aminoethers, and aminoalcohols.

5. A process according to claim 4 wherein said amine and said hydrogen donating compound are added to the reaction mixture in the form of a finely dispersed, pulverized solid formulation.

6. A process according to claim 5, wherein said finely dispersed, pulverized solid formulation is produced by a dispersing chemical reaction.

7. A process according to claim 5 wherein said amine and hydrogen donating compounds or said dispersed, pulverized solid formulations are added to the reaction mixture all at once or in several proportions.

8. A process according to claim 1, characterized in that said reducing metals are added in a finely dispersed form.

9. A process according to claim 8, characterized in that said reducing metals are added in a finely dispersed form on a finely dispersed inert solid carrier substance.

10. A process according to claim 9 wherein the formulations comprising said reducing metals and the finely dispersed inert solid carrier substances are mechanically or chemically rendered inert.

11. A process according to claim 1 wherein the reductive dehalogenation of said halogenated hydrocarbons is carried out on solid, liquid or gaseous mixtures of said halogenated hydrocarbons.

12. A process according to claim 1 wherein aqueous mixtures of halogenated hydrocarbons are dried thermally or chemically through the addition of absorbing agents before the application of the dehalogenation reaction.

13. A process according to claim 12, characterized in that calcium oxide or aluminum alcoholates are applied as absorbing agents.

14. A process according to claim 1, wherein before commencing the dehalogenation reaction, aqueous mixtures of halogenated hydrocarbons are contacted or admixed with one or more binding materials and the resultant contacted mixtures or the resultant admixtures are thermally or chemically dried and disintegrated into a finely dispersed pulverulent solid form.

15. A process according to claim 14, wherein the finely dispersed, pulverulent solid form is completely dried through the addition of calcium oxide or aluminum alcoholate.

16. A process according to claim 14, wherein volatile halogenated hydrocarbons are stripped off the finely dispersed, pulverulent and largely dried solid form and said volatile halogenated hydrocarbons are dehalogenated in the gas phase.

17. A process according to claim 1 wherein the reductive dehalogenation is carried out at a temperature ranging from room temperature to 400° C.

18. A process according to claim 1, wherein the reductive dehalogenation is carried out in a reactor tube, in an intensive or compulsory mixer, in a rotary kiln, in a fluidized bed reactor, in a packed solid bed reactor or in a solid flow reactor.

19. A method for the dechlorination of chloroaromatics as such or for the removal of said chloroaromatics from off-gas, waste oil, hydraulic oil, transformer oil, condenser oil, filter dust, ash, soil, industrial residues, industrial byproducts or waste which comprises dechlorinating said chloroaromatics by the process of claim 1.

20. The process of claim 1, wherein the amine is present at less than one-tenth of, the stoichiometric amount of the halogen.

21. The process of claim 20, wherein the ratio of amine to halogen equivalents is at least 0.1.

22. The process of claim 20, wherein the ratio of amine to halogen equivalents is at least 0.01.

23. The process of claim 20, wherein the ratio of amine to halogen equivalents is between 0.01 and 1.0.

24. The process of claim 14, wherein prior to commencing the dehalogenation reaction, the aqueous mixes of halogenated hydrocarbons are contacted or admixed with, binders and disintegrated into a dry pulverulent solid form through thermal or chemical drying, and subsequent grinding, or by means of a dispersing chemical reaction.

25. The process of claim 11, wherein the solid, liquid or gaseous mixtures comprise oil deposits, waste oil, hydraulic oil, transformer oil, condenser oil, oily residue, mineral deposits, soil, sand, silt, mud, filter dust, and ash.

26. The process of claim 24, wherein the binders comprise wet or dry soil, clay, wet fly ash, or wet industrial residues.

* * * * *